(12) United States Patent
Jung et al.

(10) Patent No.: US 11,587,413 B2
(45) Date of Patent: Feb. 21, 2023

(54) ELECTRONIC SHIFT OPERATION APPARATUS AND CONTROL METHOD THEREOF

(71) Applicants: Hyundai Motor Company, Seoul (KR); Kia Corporation, Seoul (KR); SL Corporation, Daegu (KR)

(72) Inventors: Ki Jung, Whasung-Si (KR); Jee Hyuck Choi, Whasung-Si (KR); Myung Lyul Na, Whasung-Si (KR); Young Eon Jung, Whasung-Si (KR); Hong Jun Cha, Whasung-Si (KR); Seong Guk Bae, Whasung-Si (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 17/228,587

(22) Filed: Apr. 12, 2021

(65) Prior Publication Data

US 2022/0092951 A1    Mar. 24, 2022

(30) Foreign Application Priority Data

Sep. 22, 2020    (KR) .................. 10-2020-0122207

(51) Int. Cl.
 *G08B 6/00* (2006.01)
 *B60Q 9/00* (2006.01)
(52) U.S. Cl.
 CPC .............. *G08B 6/00* (2013.01); *B60Q 9/00* (2013.01)

(58) Field of Classification Search
 USPC .. 340/407.1, 638, 426.22, 426.32, 438, 439, 340/488, 521, 539.22, 545.4, 545.5
 See application file for complete search history.

(56) References Cited

U.S. PATENT DOCUMENTS

| 10,802,527 | B1* | 10/2020 | Moore ................. G06F 3/0489 |
| 2003/0196509 | A1* | 10/2003 | Crunk ................ F16H 59/0278 |
| | | | 74/551.8 |
| 2009/0140871 | A1* | 6/2009 | Titus ........................ H02H 3/04 |
| | | | 345/173 |
| 2017/0306662 | A1* | 10/2017 | Och ........................ E05B 81/76 |
| 2018/0162387 | A1* | 6/2018 | Sung ....................... G08G 1/166 |
| 2019/0347495 | A1* | 11/2019 | Martin .................. H04N 7/181 |
| 2019/0353241 | A1* | 11/2019 | Kim ......................... F16H 59/12 |
| 2021/0172512 | A1* | 6/2021 | Soave ................... F16H 59/105 |
| 2021/0292141 | A1* | 9/2021 | Resendiz ................. B66F 3/44 |

FOREIGN PATENT DOCUMENTS

KR    10-2016-0145916 A    12/2016

* cited by examiner

*Primary Examiner* — Daniel Previl
(74) *Attorney, Agent, or Firm* — Morgan, Lewis & Bockius LLP

(57) ABSTRACT

In an electronic shift operation apparatus, an operation of a haptic actuator is controlled depending on a kind of shifting stage signal (P.R.N.D) generated at the time of an operation of a shift button to generate a different type of haptic signal, and an operation of the haptic actuator is controlled depending on a distance to a rear object positioned behind a vehicle at the time of an operation of an R-stage button to additionally generate a haptic signal.

17 Claims, 6 Drawing Sheets

ELECTRONIC SHIFT OPERATION APPARATUS AND CONTROL METHOD THEREOF

CROSS REFERENCE TO RELATED APPLICATION

The present application claims priority to Korean Patent Application No. 10-2020-0122207, filed Sep. 22, 2020, the entire contents of which is incorporated herein for all purposes by this reference.

BACKGROUND OF THE INVENTION

Field of the Invention

The present invention relates to an electronic shift operation apparatus and a control method thereof, and more particularly, to an electronic shift operation apparatus configured for preventing an erroneous operation by generating a different type of haptic signal for each shift button, and a control method thereof.

Description of Related Art

In general, a vehicle mounted with an automatic transmission controls a hydraulic pressure within a shift range set depending on a traveling speed of the vehicle to allow a gearshifting of a target shifting stage range to be automatically operated.

The automatic transmission generates a gear ratio using a hydraulic circuit, planetary gears, and friction elements to perform gear shifting, and a transmission control unit (TCU) is charge of controlling these components.

A shift by wire (SBW) system, which is an electronic shift system for a vehicle, is an electronic shift system in which a mechanical connection structure such as a cable does not exist between a transmission and a shift lever, unlike an existing mechanical shift system. In such a system, if a sensor value generated at the time of an operation of an electronic shift operation mechanism (a shift lever or a shift button) is transferred to the transmission control unit (TCU), a solenoid or an electric motor is operated by an electronic signal command from the TCU, and a hydraulic pressure is applied to the hydraulic circuit or the application of the hydraulic pressure to the hydraulic circuit is cut off for each shifting stage by the operation of the solenoid or the electric motor such that shift control is electronically performed.

Therefore, an automatic transmission based on the SBW has an advantage that shifting operations to forward (D), reverse (R), neutral (N), and parking (P) ranges may be more easily performed by transmitting driver's shift willingness as an electric signal to the TCU through a simple operation of an electronic shift operation apparatus (a shift lever, a shift button, or a shift dial), and has an advantage that a wide space may be secured between a driver's seat and a passenger's seat because a shift operation apparatus may be miniaturized.

As a main method of performing a shift operation in the electronic shift system, there are a lever type that utilizes a shift lever, a button type that utilizes a shift button, a dial type that utilizes a dial. Among them, the button type that utilizes the shift button is more easily in terms of a shift operation than the lever type, and may prevent an injury of a passenger because a contact with a passenger's body at the time of occurrence of an accident may not be generated.

However, in a case of the shift button, there is a risk of an erroneous operation because operation manners (pressing manners) and operation directions of a P-stage button, an R-stage button, an N-stage button, and a D-stage button are similar to each other.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an electronic shift operation apparatus which is configured for preventing an erroneous operation by generating a different type of primary haptic signal depending on a kind of shift button using a haptic actuator at the time of operating a shift button and is configured for providing an alarm for a rear collision to a driver by additionally generating a secondary haptic signal depending on a distance to a rear object at the time of generation of an R-stage signal, and a control method thereof.

According to various exemplary embodiments of the present invention, an electronic shift operation apparatus includes: a button housing configured to be fixed to an internal space of a vehicle; a shift button provided in the button housing and configured to be pressed and operated; a printed circuit board (PCB) provided in the button housing and configured for outputting a shifting stage signal selected at the time of the operation of the shift button to a transmission control unit connected to the PCB; and a haptic actuator provided in the button housing and generating a haptic signal at the time of the operation of the shift button.

The shift button may include a P-stage button, an R-stage button, an N-stage button, and a D-stage button, and the PCB may control an operation of the haptic actuator so that a different type of primary haptic signal is generated depending on a kind of the shifting stage signal generated at the time of the operation of the shift button.

The PCB may control the operation of the haptic actuator using an R-stage signal according to an operation of the R-stage button and a signal of a rear detection sensor, and at the same time, additionally generate a secondary haptic signal at a time of actuation of the haptic actuator.

An installation groove into which the haptic actuator is inserted may be formed in the button housing, a plurality of hook projections having a triangular cross-sectional shape may be formed in the installation groove, and the hook projections may be hooked onto an upper surface of the haptic actuator inserted into the installation groove.

A plurality of ribs in contact with the haptic actuator inserted into the installation groove to fix a position of the haptic actuator may be provided in the installation groove to protrude inwardly of the installation groove.

Movement of the haptic actuator inserted into the installation groove, in front and rear directions and in left and right directions, may be restrained by the plurality of ribs, and movement of the haptic actuator in a vertical direction may also be restricted by the hooking of the hook projections.

The electronic shift operation apparatus may further include a housing cover coupled to the button housing to cover an upper surface of the button housing, wherein the shift button is provided so that an upper portion of the shift button is externally exposed through the housing cover.

The electronic shift operation apparatus may further include: a housing cover covering an upper surface of the button housing; a plurality of screw members penetrating through flanges of the button housing and coupled to stud portions of the housing cover to couple the button housing to the housing cover; screw dampers coupled to the screw members; and housing dampers fixed to the flanges of the button housing, wherein the plurality of screw members is provided to penetrate through and is coupled to the screw dampers and the housing dampers.

According to various exemplary embodiments of the present invention, a method of controlling an electronic shift operation apparatus including a shift operation mechanism and a haptic actuator, includes: generating a primary haptic signal by actuation of the haptic actuator by control of a PCB if a brake signal and a shifting stage signal are sequentially generated in a start-on state of a vehicle, wherein the primary haptic signal is a different type of haptic signal generated depending on a kind of the shifting stage signal.

The shift operation mechanism may be a shift button.

The primary haptic signal may be a haptic signal in which a vibration frequency, an intensity of a voltage input to the haptic actuator, and the number of vibrations are different depending on the kind of the shifting stage signal.

The method of controlling an electronic shift operation apparatus may further include: determining whether or not a distance from the vehicle to a rear object positioned behind the vehicle is within a reference distance using a signal of a rear detection sensor according to an R-stage signal after the primary haptic signal is generated; and additionally generating a secondary haptic signal by actuation of the haptic actuator by control of the PCB when it is determined that the distance to the rear object is within the reference distance.

The secondary haptic signal may be generated as stronger as the distance to the rear object positioned behind the vehicle becomes closer.

If the brake signal is not generated or the shifting stage signal is not generated even though the brake signal is generated, in the start-on state of the vehicle, the haptic actuator may not be actuated by control of the PCB such that the primary haptic signal is not generated.

If an N-stage signal is generated, an N-stage signal generation duration exceeds a first reference time, and a start-off entry time is within a second reference time, in a start-off state of the vehicle, the PCB may determine that the vehicle is in an N-stage parking situation and control the haptic actuator to be actuated, generating the primary haptic signal.

If the N-stage signal is not generated, the N-stage signal generation duration does not exceed the first reference time even though the N-stage signal is generated, or the start-off entry time is not within the second reference time even though the N-stage signal is generated and the N-stage signal generation duration exceeds the first reference time, in the start-off state of the vehicle, the PCB may determine that the vehicle is not in the N-stage parking situation and control the haptic actuator so as not to be actuated.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
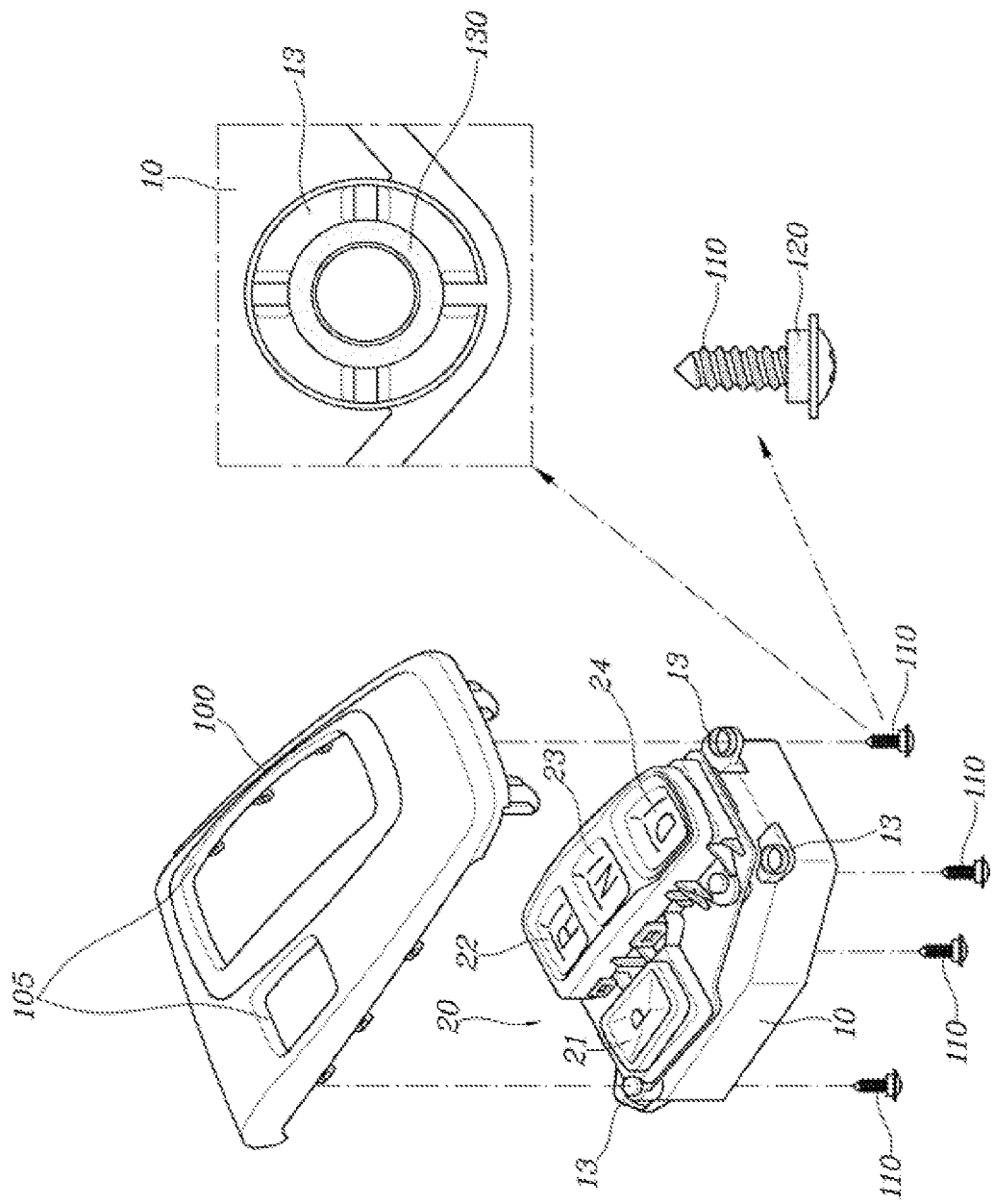
FIG. 1 is a view exemplarily illustrating a state in which a housing cover is separated in an electronic shift operation apparatus according to various exemplary embodiments of the present invention.
Figure 2:
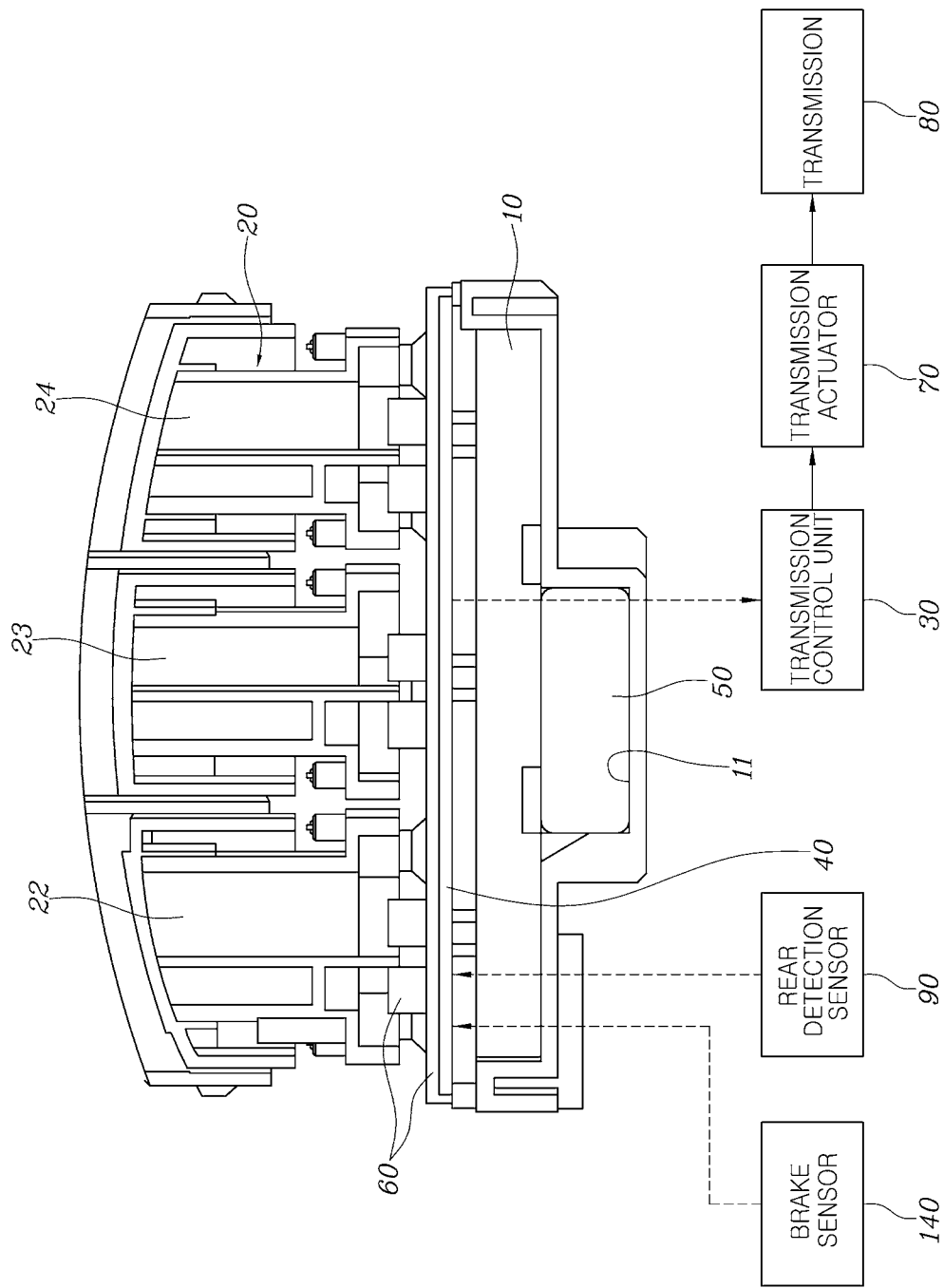
FIG. 2 is a cross-sectional view exemplarily illustrating the state in which the housing cover is separated.
Figure 3:
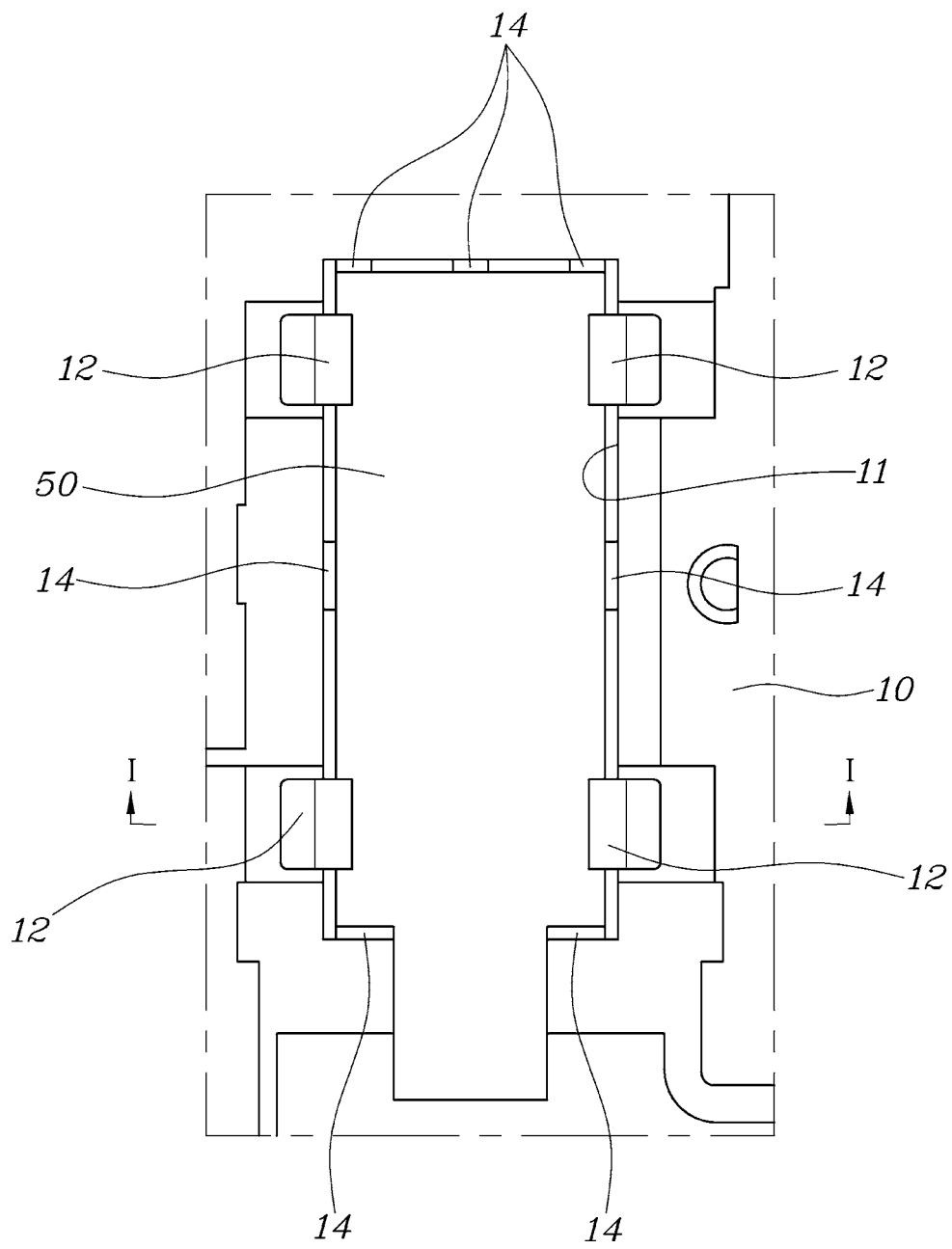
FIG. 3 is a plan view of a portion in which a haptic actuator is provided in FIG. 2.
Figure 4:
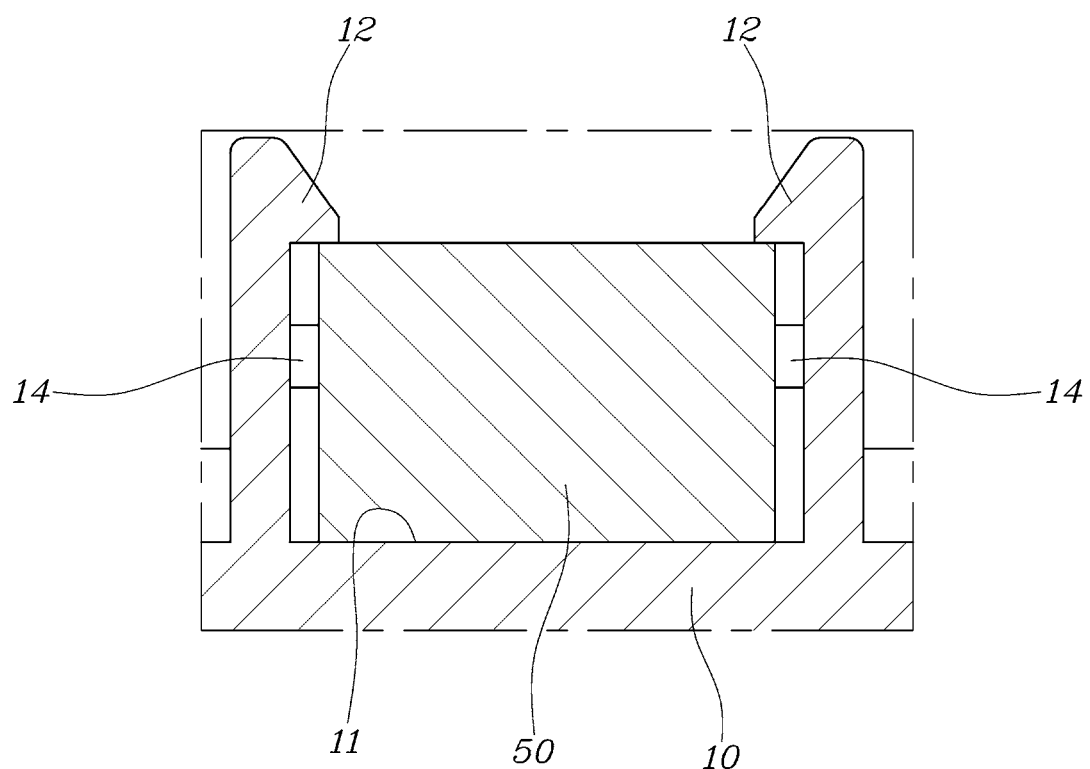
FIG. 4 is a cross-sectional view taken along line I-I of FIG. 3.
Figure 5:
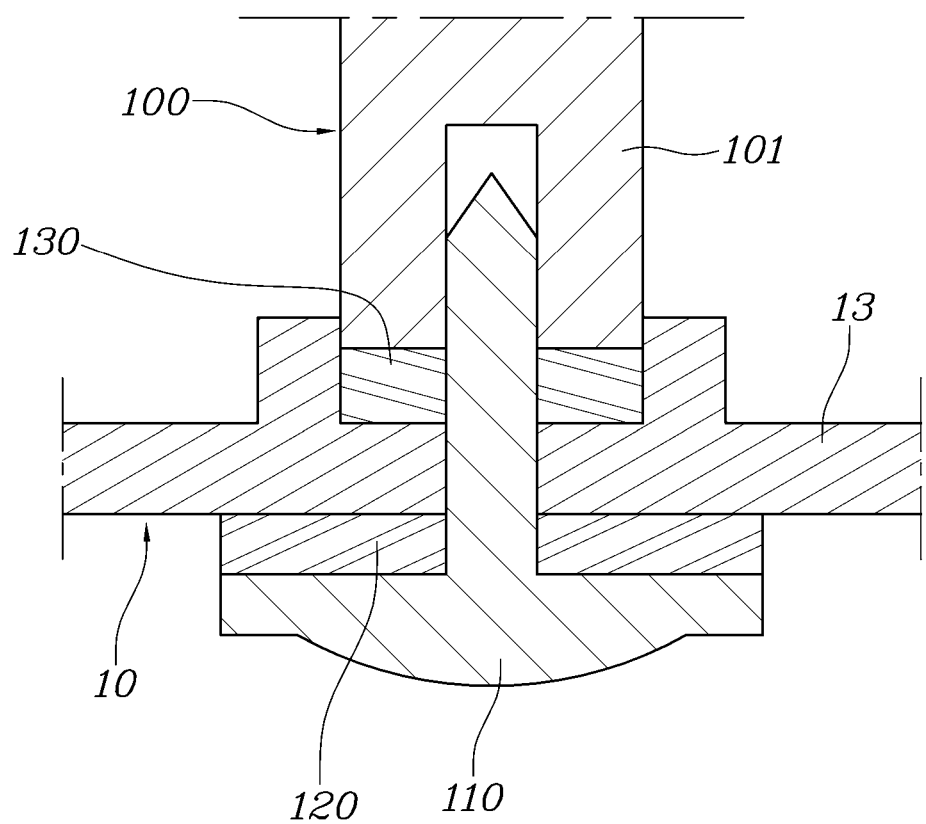
FIG. 5 is a cross-sectional view for describing a coupled portion between a button housing and a housing cover according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions will be provided only to describe embodiments of the present invention included in the exemplary embodiment or application. Therefore, embodiments of the present invention may be implemented in various forms, and the present invention is not to be interpreted as being limited to exemplary embodiments described in the exemplary embodiment or application.

Since embodiments of the present invention may be variously modified and may have several forms, specific embodiments will be illustrated in the accompanying drawings and will be described in detail in the exemplary embodiment or application. However, it is to be understood that the present invention is not limited to specific embodiments, but includes all modifications, equivalents, and substitutions falling in the spirit and the scope of the present invention.

Terms such as "first", "second", and the like, may be used to describe various components, but the components are not to be construed as being limited to the terms. The terms are used only to distinguish one component from another component. For example, a "first" component may be referred to as a "second" component and a "second" component may be similarly referred to as a "first" component, without departing from the scope of the present invention.

It is to be understood that when one component is referred to as being "connected to" or "coupled to" another component, one component may be connected directly to or coupled directly to another component or be connected to or coupled to another component with the other component interposed therebetween. On the other hand, it is to be understood that when one component is referred to as being "connected directly to" or "coupled directly to" another component, it may be connected to or coupled to another component without the other component interposed therebetween. Other expressions describing a relationship between components, that is, "between", "directly between", "neighboring to", "neighboring directly to", and the like, are to be similarly interpreted.

Terms used in the exemplary embodiment are used only to describe specific embodiments rather than limiting the present invention. Singular forms are intended to include plural forms unless the context clearly indicates otherwise. It is to be understood that terms "include" or "have" used in the exemplary embodiment specify the presence of stated features, numerals, steps, operations, components, parts, or combinations thereof, but do not exclude the presence or addition of one or more other features, numerals, steps, operations, components, parts, or combinations thereof.

Unless indicated otherwise, it is to be understood that all the terms used herein including technical and scientific terms have the same meaning as those generally understood by those skilled in the art to which various exemplary embodiments of the present invention pertains. Terms defined by a generally used dictionary are to be interpreted as having meanings identical with meanings within a context of the related art, and are not interpreted as having ideal or excessively formal meanings unless explicitly defined in the exemplary embodiment of the present invention.

A controller according to various exemplary embodiments of the present invention may be implemented through a non-volatile memory configured to store data on an algorithm configured to control operations of various components of a vehicle or software instructions reproducing the algorithm and a processor configured to perform operations to be described below using the data stored in the non-volatile memory. Here, the memory and the processor may be implemented as individual chips. Alternatively, the memory and the processor may be integrated with each other and implemented as a single chip. The processor may have a form of one or more processors.

Hereinafter, an electronic shift operation apparatus and a control method thereof according to various exemplary embodiments of the present invention will be described with reference to the accompanying drawings.

An electronic shift operation apparatus according to various exemplary embodiments of the present invention includes a button housing 10 configured to be fixed to an internal space of a vehicle; a shift button 20 provided in the button housing 10 and pressed and operated by a driver; a printed circuit board (PCB) 40 provided in the button housing 10 and outputting a shifting stage signal selected at the time of the operation of the shift button 20 to a transmission control unit (TCU) 30; and a haptic actuator 50 provided in the button housing 10 and generating a haptic signal at the time of the operation of the shift button 20, as illustrated in FIG. 1, FIG. 2, FIG. 3, FIG. 4, and FIG. 5.

The button housing 10 is configured to be fixed to a vehicle body such as a console or a center fascia adjacent to a driver's seat in a vehicle interior, but an installation position of the button housing 10 may be changed, if necessary.

The shift button 20 includes a P-stage button 21, an R-stage button 22, an N-stage button 23, and a D-stage button 24.

A switch rubber 60 is positioned under the shift button 20, and the PCB 40 fixed to the button housing 10 is positioned under the switch rubber 60.

Therefore, if the driver presses and operates the shift button 20, the switch rubber 60 is in contact with the PCB 40 to generate a shifting stage signal, and if the driver releases an operating force, the shift button 20 that has descended downward ascends upward and returns to an initial position by a restoring force of the switch rubber 60.

A shift by wire (SBW) system, which is an electronic shift system for a vehicle, has a configuration in which a mechanical connection structure such as a cable does not exist between the shift button 20 and a transmission 80. In such a system, if a signal generated at the time of an operation of the shift button 20 is transferred to the transmission control unit 30 through the PCB 40, a transmission actuator 70 (shift cable motor and select cable motor) is operated by a signal command from the transmission control unit 30, and a hydraulic pressure is applied to a hydraulic circuit or the application of the hydraulic pressure to the hydraulic circuit is cut off for each shifting stage of the transmission 80 by the operation of the transmission actuator 70 such that shift control is electronically performed.

Furthermore, an electronic shift system based on the SBW may be used together with an electronic clutch apparatus, and if the signal generated at the time of the operation of the shift button 20 is transferred to a clutch controller through the PCB 40, a clutch actuator is operated by a signal command from the clutch controller, and a clutch is disconnected and connected by the operation of the clutch actuator such that clutch control is electrically performed.

The PCB 40 is configured to be fixed to the button housing 10 to face the switch rubber 60, and is configured to receive the shifting stage signal generated at the time of the operation of the shift button 20 and output the shifting stage signal to the shift controller 30.

The haptic actuator 50 is configured to be fixed to the button housing 10 at a position under the PCB 40, and the PCB 40 is configured to control an operation of the haptic actuator 50 and controls an operation of the haptic actuator 50 so that a different type of primary haptic signal is generated depending on a kind of shifting stage signal (P.R.N.D) generated at the time of the operation of the shift button 20.

The primary haptic signal is a haptic signal in which a vibration frequency, an intensity of a voltage input to the haptic actuator 50, the number of vibrations, and the like, are different depending on the kind of the shifting stage signal. As an example, when the shifting stage signal is a P-stage signal, the primary haptic signal is a haptic signal having a vibration frequency of 140 Hz, a voltage of 4.0 v, a delay of 0 s, a strong intensity, and the number of vibrations of 1, when the shifting stage signal is an R-stage signal, the primary haptic signal is a haptic signal having a vibration frequency of 140 Hz, a voltage of 4.0 v, a delay of 10 ms, a strong intensity, and the number of vibrations of 8 to 10, when the shifting stage signal is an N-stage signal, the primary haptic signal is a haptic signal having a vibration frequency of 120 Hz, a voltage of 4.0 v, a delay of 100 ms, a little strong intensity, and the number of vibrations of 2, and when the shifting stage signal is a D-stage signal, the primary haptic signal is a haptic signal having a vibration frequency of 120 Hz, a voltage of 4.0 v, a delay of 50 ms, a little strong intensity, and the number of vibrations of 3.

Accordingly, if the different type of primary haptic signal is generated depending on the kind of shifting stage signal (P.R.N.D) when the shift button 20 is operated, an erroneous operation of the driver may be prevented.

Furthermore, the PCB 40 according to various exemplary embodiments of the present invention is further configured for controlling an operation of the haptic actuator 50 using the R-stage signal according to an operation of the R-stage button 22 and a signal of a rear detection sensor 90. In the instant case, when the haptic actuator 50 is actuated, a secondary haptic signal is additionally generated.

If the driver operates the R-stage button 22 to back the vehicle, the rear detection sensor 90 provided in the vehicle detects a rear object positioned behind the vehicle, and the PCB 40 controls the operation of the haptic actuator 50 depending on a distance to the rear object positioned behind the vehicle. In the instant case, if the haptic actuator 50 is actuated by the control of the PCB 40, the secondary haptic signal is additionally generated, and the driver recognizes an alarm (risk) for a rear collision through the additionally generated secondary haptic signal. Therefore, occurrence of an accident may be prevented.

An installation groove 11 into which the haptic actuator 50 is inserted is formed in the button housing 10, a plurality of hook projections 12 having a triangular cross-sectional shape are formed in the installation groove 11, and the hook projections 12 are hooked onto an upper surface of the haptic actuator 50 inserted into the installation groove 11 to fix the haptic actuator 50.

Furthermore, a plurality of ribs 14 in contact with the haptic actuator 50 inserted into the installation groove 11 to fix a position of the haptic actuator 50 may be provided in the installation groove 11 to protrude inwardly of the installation groove 11.

The plurality of ribs 14 are in contact with the haptic actuator 50 inserted into the installation groove 11 to be configured to easily transfer the haptic signal to the button housing 10 at the time of the actuation of the haptic actuator 50.

Movement of the haptic actuator 50, which is inserted into the installation groove 11 of the button housing 10, in front and rear directions and in left and right directions, is restrained by the plurality of ribs 14, and movement of the haptic actuator 50 in a vertical direction is also restricted by the hooking of the hook projections 12. Therefore, the button housing 10 and the haptic actuator 50 are coupled as close to each other as possible.

Therefore, if a vibration is generated by the actuation of the haptic actuator 50, the vibration of the haptic actuator 50 is transferred as a tactile signal to the driver through the button housing 10 and the shift button 20 as much as possible without being lost. Therefore, recognizability of the driver may be maximized.

The electronic shift operation apparatus according to various exemplary embodiments of the present invention further includes a housing cover 100 coupled to the button housing 10 to cover an upper surface of the button housing 10, in which the shift button 20 is provided so that an upper portion of the shift button 20 is externally exposed through the housing cover 100. Therefore, the driver may press and operate the shift button 20 externally exposed through openings 105 of the housing 100 with his or her finger.

The electronic shift operation apparatus according to various exemplary embodiments of the present invention further includes a housing cover 100 covering an upper surface of the button housing 10, a plurality of screw members 110 penetrating through flanges 13 of the button housing 10 and coupled to stud portions 101 of the housing cover 100 to couple the button housing 10 to the housing cover 100, screw dampers 120 coupled to the screw members 110, and housing dampers 130 fixed to the flanges 13 of the button housing 10, in which the screw member 110 is provided to penetrate through and is coupled to the screw damper 120 and the housing damper 130.

The screw member 110 is preferably a screw, and the screw damper 120 and the housing damper 130 are preferably formed of rubber or silicone having elasticity, but are not limited thereto.

Therefore, if a vibration is generated by the actuation of the haptic actuator 50, most of the vibration of the haptic actuator 50 is preferably transferred as the tactile signal to the driver through the button housing 10 and the shift button 20 to improve the recognizability of the driver.

If a portion of the vibration generated in the haptic actuator 50 is transferred to the housing cover 100, a vibration transferred to the driver through the button housing 10 is decreased by a magnitude (intensity) of the vibration transferred to the housing cover 100, and a haptic signal felt by the driver is thus decreased. As a result, in some cases, even though the driver operates the shift button 20, a problem that the driver does not feel the tactile signal may occur.

The electronic shift operation apparatus according to various exemplary embodiments of the present invention has a configuration in which the screw damper 120 and the housing damper 130 are dually positioned between the button housing 10 and the housing cover 100 to prevent such a problem. Therefore, the vibration transferred to the housing cover 100 at the time of the actuation of the haptic actuator 50 may be minimized through the screw damper 120 and the housing damper 130, and conversely, most of the vibration may be transferred to the button housing 10 such that the haptic signal felt by the driver may be maximized.

Furthermore, the vibration transferred to the housing cover 100 through the screw damper 120 and the housing damper 130 may be minimized such that noise generated by the housing cover 100 may be significantly decreased.

Figure 6:
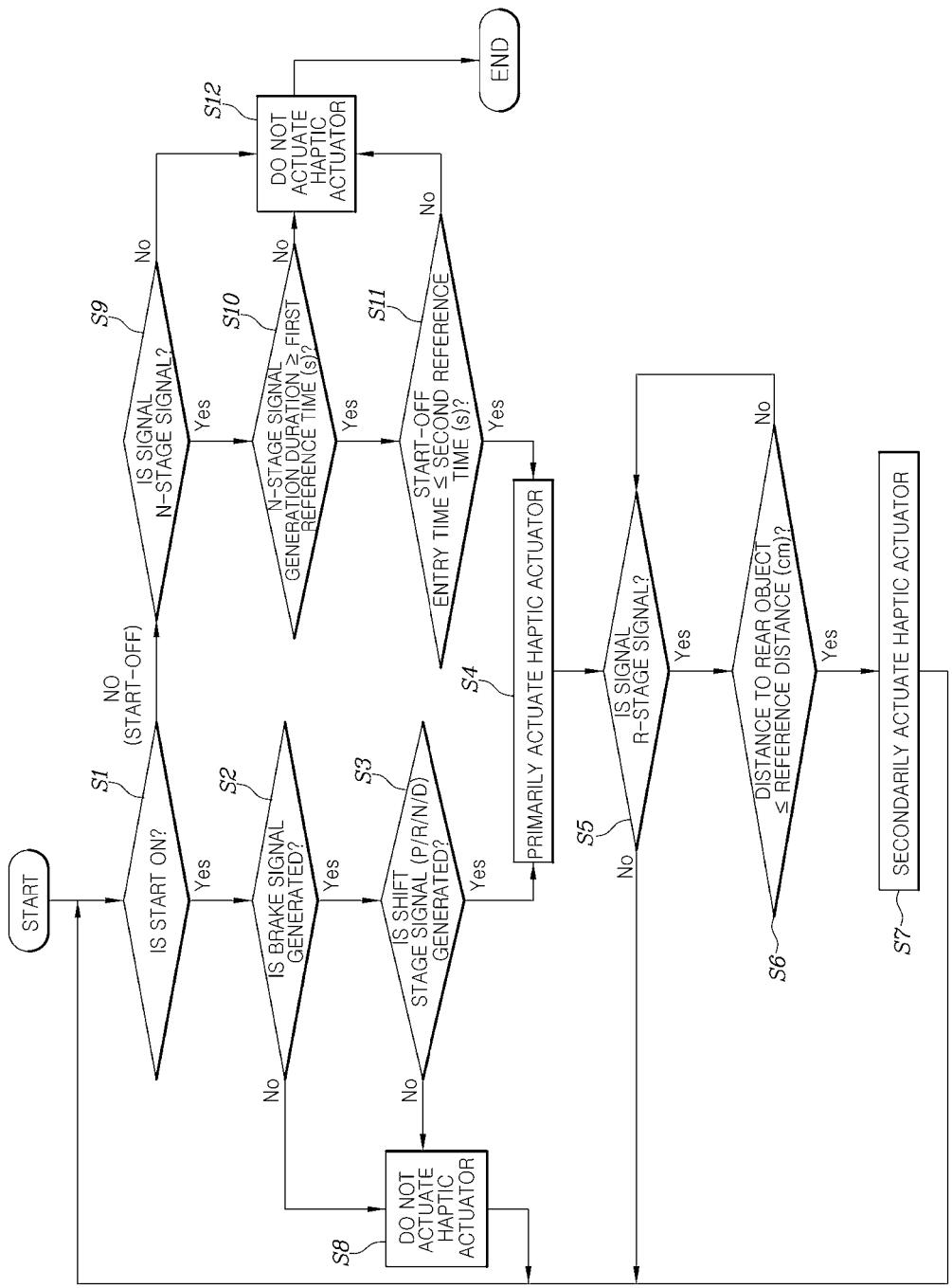
FIG. 6 is a view for describing a control method of the electronic shift operation apparatus according to various exemplary embodiments of the present invention.

Hereinafter, a control method of the electronic shift operation apparatus according to various exemplary embodiments of the present invention will be described with reference to FIG. 6.

In a start-on state (S1) of a vehicle, a brake signal is generated through a brake sensor 140 by operation of a brake by the driver (S2), and if the shifting stage signal is generated by the operation of the shift button 20 (S3), the haptic actuator 50 is actuated by the control of the PCT 40. As a result, the primary haptic signal is generated (S4).

As the primary haptic signal, a different type of primary haptic signal is generated depending on the kind of shifting stage signal (P.R.N.D) generated at the time of the operation of the shift button 20, and the primary haptic signal is, for example, a haptic signal in which a vibration frequency, an intensity of a voltage input to the haptic actuator 50, the number of vibrations, and the like, are different. Therefore, an erroneous operation of the driver at the time of operating the shift button 20 may be prevented.

If an R-stage signal is newly generated by operation of the R-stage button 22 after the primary haptic signal is generated or an R-stage signal generated in S3 is maintained (S5), the PCB 40 receives a signal of the rear detection sensor 90 and determines whether or not the distance to the rear object positioned behind the vehicle is within a reference distance (cm) (S6), and when it is determined that the distance to the rear object is within the reference distance as a determination result, the secondary haptic signal is additionally generated by the actuation of the haptic actuator 50 by the control of the PCB 40 (S7).

If the driver operates the R-stage button 22 to back the vehicle, the rear detection sensor 90 provided in the vehicle detects a rear object positioned behind the vehicle, and the PCB 40 controls the operation of the haptic actuator 50 depending on a distance to the rear object positioned behind the vehicle. In the instant case, if the haptic actuator 50 is actuated by the control of the PCB 40, the secondary haptic signal is additionally generated, and the driver recognizes an alarm (risk) for a rear collision through the additionally generated secondary haptic signal. Therefore, occurrence of an accident caused by the backing of the vehicle may be prevented.

The secondary haptic signal is generated as a stronger signal as the distance to the rear object positioned behind the vehicle becomes closer to the vehicle. Therefore, the driver may more certainly recognize a risk of a collision.

If the vehicle is in the start-on state in S1 and the brake signal is not generated in S2 or the shifting stage signal is not generated in S3 even though the brake signal is generated in S2, the haptic actuator 50 is not actuated by the control of the PCB 40 such that the primary haptic signal is not generated (S8), and the subsequent control logic is fed back to S1.

Furthermore, when it is determined that the R-stage signal is not generated as a determination result in S5, the process is fed back to S1 such that a control logic is continuously performed.

Furthermore, when it is determined that the distance to the rear object is not within the reference distance as a determination result in S6, the process is fed back to S5 such that a control logic is continuously performed.

On the other hand, if the vehicle is in a start-off state in S1, the N-stage signal is generated (S9), an N-stage signal generation duration exceeds a first reference time (s) (S10), and a start-off entry time is within a second reference time (s) (S11), the PCB 40 determines that the vehicle is in an N-stage parking situation and controls the haptic actuator 50 to be actuated, generating the primary haptic signal.

However, if the N-stage signal is not generated, the N-stage signal generation duration does not exceed the first reference time even though the N-stage signal is generated, or the start-off entry time is not within the second reference time even though the N-stage signal is generated and the N-stage signal generation duration exceeds the first reference time, in the start-off state of the vehicle in S1, the PCB 40 determines that the vehicle is not in the N-stage parking situation and controls the haptic actuator 50 so as not to be actuated (S12). Accordingly, a control logic ends.

Furthermore, the present invention is a control method for generating a haptic signal of an electronic shift operation apparatus including a shift operation mechanism and a haptic actuator, the control method including generating a primary haptic signal by the actuation of the haptic actuator by the control of the PCB if a brake signal and a shifting stage signal are sequentially generated in a start-on state of a vehicle, in which the primary haptic signal is a different type of haptic signal generated depending on a kind of the shifting stage signal.

Here, the shift operation mechanism may be any one of a shift button, a shift lever, a shift dial, or another type of operation mechanism.

As described above, the exemplary embodiment according to various exemplary embodiments of the present invention is a button-type electronic shift operation apparatus including the shift button 20 and the haptic actuator 50. In the electronic shift operation apparatus, the different type of haptic signal is generated depending on the kind of shifting stage signal (P.R.N.D) generated at the time of operating the shift button 20. Therefore, the erroneous operation of the driver may be prevented.

Furthermore, the exemplary embodiment according to various exemplary embodiments of the present invention has a configuration in which the haptic signal may be additionally generated through the actuation of the haptic actuator 50 depending on the distance to the rear object positioned behind the vehicle using the signal of the rear detection sensor 90 at the time of the operation of the R-stage button 22. Therefore, the haptic signal for the rear collision may be transferred to the driver such that the occurrence of the accident at the time of backing the vehicle may be prevented.

Furthermore, the exemplary embodiment according to various exemplary embodiments of the present invention may provide the haptic signal to the driver through the actuation of the haptic actuator 50 even though the vehicle is in the N-stage parking situation.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An electronic shift operation apparatus comprising:
a button housing configured to be fixed to an internal space of a vehicle;
a shift button provided in the button housing and configured to be pressed and operated;
a printed circuit board (PCB) provided in the button housing and configured for outputting a shifting stage signal selected at a time of operation of the shift button to a transmission control unit connected to the PCB; and
a haptic actuator provided in the button housing and generating a haptic signal at the time of the operation of the shift button,
wherein the shift button includes a P-stage button, an R-stage button, an N-stage button, and a D-stage button,
wherein the PCB is configured to control an operation of the haptic actuator to generate a primary haptic signal upon determining that a brake signal and a shifting stage signal are sequentially generated in a start-on state of the vehicle.

2. The electronic shift operation apparatus of claim 1, wherein the PCB is configured to control the operation of the haptic actuator so that a different type of the primary haptic signal is generated depending on a kind of the shifting stage signal generated at the time of the operation of the shift button.

3. The electronic shift operation apparatus of claim 2, wherein the PCB is configured to control the operation of the haptic actuator using an R-stage signal according to an operation of the R-stage button and a signal of a rear detection sensor, and is configured to generate a secondary haptic signal at a time of actuation of the haptic actuator.

4. The electronic shift operation apparatus of claim 1,
wherein an installation groove into which the haptic actuator is inserted is formed in the button housing,
wherein a plurality of hook projections having a triangular cross-sectional shape is formed in the installation groove, and
wherein the plurality of hook projections is hooked onto an upper surface of the haptic actuator inserted into the installation groove.

5. The electronic shift operation apparatus of claim 4, wherein a plurality of ribs in contact with the haptic actuator inserted into the installation groove to fix a position of the haptic actuator, is provided in the installation groove to protrude inwardly of the installation groove.

6. The electronic shift operation apparatus of claim 5, wherein movement of the haptic actuator inserted into the installation groove, in front and rear directions and in left and right directions, is restrained by the plurality of ribs, and movement of the haptic actuator in a vertical direction is restricted by hooking of the hook projections.

7. The electronic shift operation apparatus of claim 1, further including:
a housing cover coupled to the button housing to cover an upper surface of the button housing,
wherein an upper portion of the shift button is externally exposed through an opening of the housing cover.

8. The electronic shift operation apparatus of claim 1, further including:
a housing cover covering an upper surface of the button housing;
a plurality of screw members penetrating through flanges of the button housing and coupled to stud portions of the housing cover to couple the button housing to the housing cover;
screw dampers coupled to the screw members; and
housing dampers fixed to the flanges of the button housing,
wherein the plurality of screw members is provided to penetrate through and is coupled to the screw dampers and the housing dampers.

9. The electronic shift operation apparatus of claim 8, wherein the plurality of screw members is provided to penetrate the screw dampers, the flanges, the housing dampers and the stud portions of the housing cover in series.

10. A method of controlling an electronic shift operation apparatus including a shift operation mechanism and a haptic actuator, the method comprising:
generating a primary haptic signal by actuation of the haptic actuator by control of a printed circuit board (PCB) upon determining that a brake signal and a shifting stage signal are sequentially generated in a start-on state of a vehicle,
wherein the primary haptic signal is a type of haptic signal differently generated depending on a kind of the shifting stage signal.

11. The method of claim 10, wherein the shift operation mechanism is a shift button.

12. The method of claim 10, wherein the primary haptic signal is a haptic signal in which a vibration frequency, an intensity of a voltage input to the haptic actuator, and a number of vibrations are different depending on the kind of the shifting stage signal.

13. The method of claim 10, further including:
determining, by a controller, when a distance from the vehicle to a rear object positioned behind the vehicle is within a reference distance using a signal of a rear detection sensor according to an R-stage signal after the primary haptic signal is generated; and
generating a secondary haptic signal by actuation of the haptic actuator by the controller's control of the PCB upon determining that the distance to the rear object is within the reference distance.

14. The method of claim 13, wherein the secondary haptic signal is generated as stronger as the distance to the rear object positioned behind the vehicle becomes closer to the vehicle.

15. The method of claim 10, wherein upon determining that the brake signal is not generated or the shifting stage signal is not generated even though the brake signal is generated, in the start-on state of the vehicle, the haptic actuator is not actuated by control of the PCB so that the primary haptic signal is not generated.

16. The method of claim 10, wherein upon determining that an N-stage signal is generated, an N-stage signal generation duration exceeds a first reference time, and a start-off entry time is within a second reference time, in a start-off state of the vehicle, the PCB is configured to determine that the vehicle is in an N-stage parking situation and is configured to control the haptic actuator to be actuated, generating the primary haptic signal.

17. The method of claim 16, wherein upon determining that the N-stage signal is not generated, the N-stage signal generation duration does not exceed the first reference time even though the N-stage signal is generated, or the start-off entry time is not within the second reference time even though the N-stage signal is generated and the N-stage signal generation duration exceeds the first reference time, in the start-off state of the vehicle, the PCB is configured to determine that the vehicle is not in the N-stage parking situation and controls the haptic actuator so as not to be actuated.

* * * * *